United States Patent
Cieslak et al.

(10) Patent No.: US 12,307,267 B1
(45) Date of Patent: May 20, 2025

(54) BRANCH PREDICTION FOR APIs

(71) Applicants: Michael Cieslak, Los Angeles, CA (US); Jiayao Yu, Venice, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(72) Inventors: Michael Cieslak, Los Angeles, CA (US); Jiayao Yu, Venice, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/408,655

(22) Filed: May 10, 2019

(51) Int. Cl.
*G06F 9/448* (2018.01)

(52) U.S. Cl.
CPC .................. *G06F 9/4484* (2018.02)

(58) Field of Classification Search
None
See application file for complete search history.

(56) References Cited

U.S. PATENT DOCUMENTS

| | | | |
|---|---|---|---|
| 6,542,938 B1* | 4/2003 | Kamen | G06T 15/00 715/201 |
| 6,842,892 B1* | 1/2005 | Goldberg | G06F 8/34 717/108 |
| 9,697,545 B1* | 7/2017 | Hermany | G06Q 10/06395 |
| 2011/0113405 A1* | 5/2011 | Guerrera | G06F 11/3419 717/125 |
| 2014/0036095 A1* | 2/2014 | Kaehler | G06F 3/042 348/E17.002 |
| 2016/0360160 A1* | 12/2016 | Eizenberg | G06F 16/51 |
| 2017/0261949 A1* | 9/2017 | Hoffmann | G05B 13/0265 |
| 2018/0307464 A1* | 10/2018 | Bijani | G06F 8/36 |
| 2019/0342454 A1* | 11/2019 | Sugaya | G06F 9/5055 |
| 2020/0152191 A1* | 5/2020 | Touyama | G10L 15/10 |

\* cited by examiner

*Primary Examiner* — Chat C Do
*Assistant Examiner* — William C Wood
(74) *Attorney, Agent, or Firm* — CM Law; Stephen J. Weed (57) ABSTRACT

Providing branch prediction of APIs to determine the best API for an application to use when performing a function. An API history buffer stores a history of performance data in association with APIs when the function is performed by an application. An API map dynamically stores application performance data in association with APIs. This history data and the API map is used by a circumstance engine and a circumstance engine service to provide a suggested API to an application when it is ready to perform a function.

3 Claims, 8 Drawing Sheets

| Request | Latency | Parameter 1 | Parameter 2 |
|---|---|---|---|
| A | $X_0$ | PA | PF |
| B | $X_1$ | PB | PG |
| C | $X_2$ | PC | PH |
| A | $X_3$ | PD | PI |
| ⋮ | | | |
| C | $X_n$ | PE | PJ |

FIG. 6

| User API | Execution Latency |
|---|---|
| API 1 | $X_0$ |
| API 2 | $X_1$ |
| API 3 | $X_2$ |
| ⋮ | |
| API N | $X_n$ |

BRANCH PREDICTION FOR APIs

TECHNICAL FIELD

The present disclosure generally relates to performance metrics of various client devices.

BACKGROUND

Performance metrics of client devices vary from device to device. The performance metrics affect communication between client devices, and the use of certain features in an application.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

One aspect of the present disclosure describes providing branch prediction of APIs for use with certain applications on a client device. Branch prediction for APIs lets developers have tighter control over what APIs are used by using historical execution information to determine which is the best API to use on a client device for a given application. This enables developers to use the best API for a client device without having to set a global policy that negatively impact some users. One example is to capture the latency when a user calls the application and when the application performs a task. Increases to this latency can cause engagement drops as the task is not performed timely and not to the satisfaction of the user. Branch prediction for APIs tunes the task performance experience on a per user per device level, ensuring that the user always has an adequate performance with the highest quality for a given budget.

The client device using applications tracks the performance of the utilized API on the client device and stores this information in a history buffer. The history buffer may include, for instance, the latency of the API in association with one or more parameters of the application when the API is called. This history buffer is used in future calls to make a decision on what API to use for a given application. In addition to storing this information locally in the client device, these results are reported back to a server system for aggregation which is then used in rules to control APIs on client devices.

On the server system, this data is aggregated on a per device level to provide better hints to the per-user framework as to what API is most likely the best for an application on a client device. The aggregated data is used by the server system to build a map between APIs and execution latency. This data is then sent to the client device for the general flow to pick up and use in its prediction strategy.

Details of the API prediction for APIs is provided below.

Figure 1:
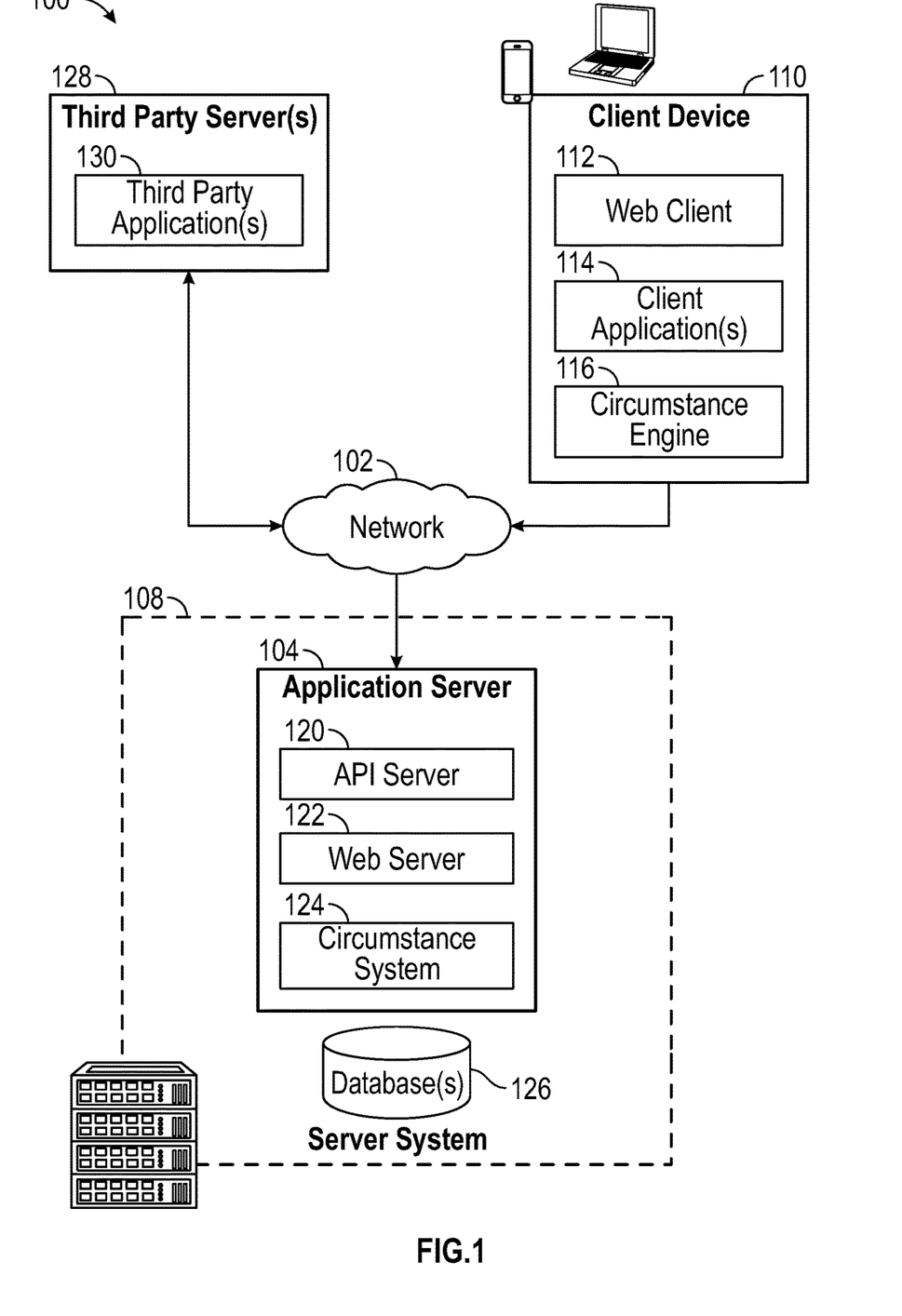
FIG. 1 is a block diagram illustrating a system configured to provide branch prediction of application program interfaces (APIs) for use with certain applications on a client device.

FIG. 1 is a block diagram illustrating a system 100, according to some examples, configured to track API performance on a client device 110. The system 100 includes one or more client devices 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a given user who uses an application 114 on an online social platform. Client device 110 accesses a website of an online social platform hosted by a server system 108. The user inputs login credentials associated with the user. Server system 108 receives the request and provides access to the online social platform.

A user of the client device 110 launches and engages an application 114 hosted by the server system 108. The client device 110 has a circumstance engine 116 including a processor running client code for performing the acquisition and storing of the performance of APIs in association with parameters on client device 110. The circumstance engine 116 obtains the API performance, such as latency, in association with device parameters for multiple calls of the API and stores the API performance in a history buffer without significantly affecting operation of the application 114. The circumstance engine 116 dynamically downloads the API performance data to the circumstance engine 124 of the server system 108 when the client device 110 logs on to the server system 108.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

The server system 108 provides server-side functionality via the network 102 (e.g., the Internet or wide area network (WAN)) to: one or more third party server(s) 128, and one or more client devices 110. The server system 108 includes an application server 104 including an application program interface (API) server 120, a web server 122, and a circumstance system 124, that may be communicatively coupled with one or more database(s) 126. The one or more database(s) 126 may be storage devices that store data related to users of the server system 108, applications associated with the server system 108, cloud services, housing market data, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The server system 108 includes the circumstance system 124. Circumstance system 124 may include one or more servers and may be associated with a cloud-based application. Circumstance system 124 obtains API performance of client devices 110 communicating with the operating application 114 on the client device 110 from circumstance engine 116. The details of the circumstance system 124 are provided below in connection with FIG. 2, and the details of the circumstance engine 116 are provided below in connection with FIG. 3.

The system 100 further includes one or more third party server(s) 128. The one or more third-party server(s) 128 may include one or more third party application(s) 130. The one or more third party application(s) 130, executing on third party server(s) 128 may interact with the server system 108 via API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
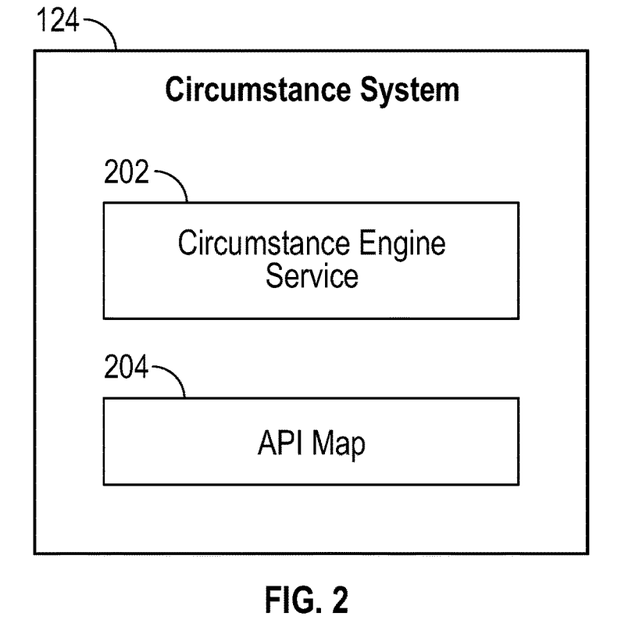
FIG. 2 is a block diagram illustrating the circumstance system operable within server system.

FIG. 2 is a block diagram illustrating the circumstance system 124 operable within server system 108. Circumstance system 124 is seen to include a circumstance engine service 202, and an API map 204. The circumstance engine service 202 in tandem with circumstance engine 116, have rules to provide the application 114 running on the client device 110 with configuration settings based on user, device, current circumstances, and suggested API for application 114 running on client device 110. The circumstance engine service 202 and API map 302 aggregate the API performance data from the client device 110 on a per device level to provide better hints to the per-user framework as to what API is most likely the best for a given application 114 operating on the client device 110. The aggregated API performance data from the circumstance engine 116 is used by the circumstance engine service 202 to build a map of APIs to API performance, such as execution latency, which is stored in API map 204. This API performance data is sent to the circumstance engine 116 of client device 110 in the general flow to pick up and use in its prediction strategy.

Figure 3:
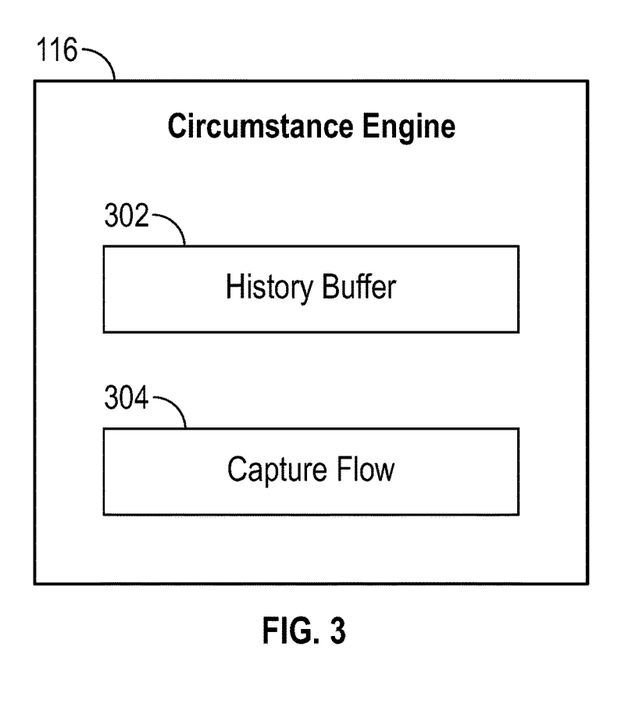
FIG. 3 is a block diagram illustrating the circumstance engine operable on the client device.
Figure 6:
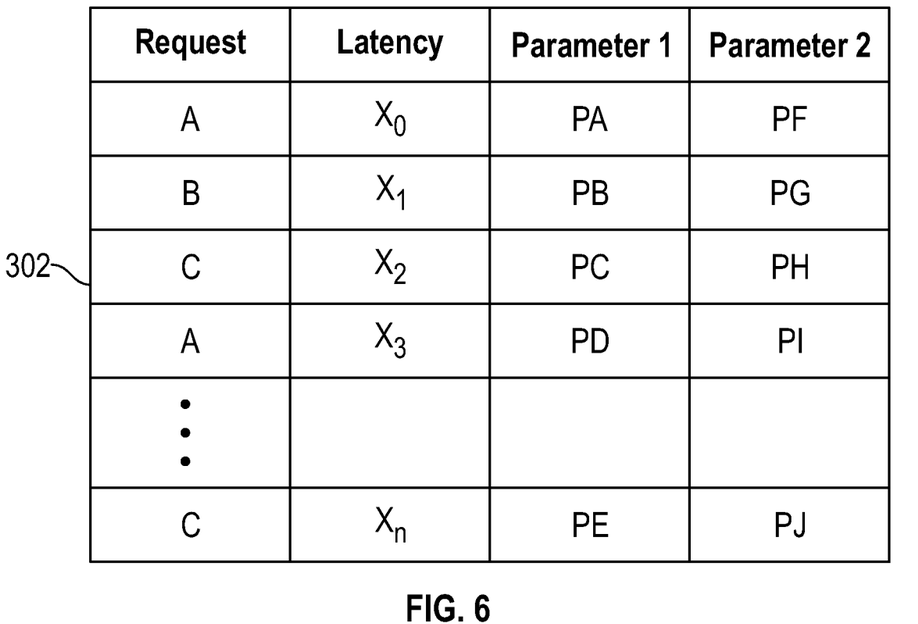
FIG. 6 illustrates an example chart of an API history buffer.

FIG. 3 is a block diagram illustrating the circumstance engine 116 operable on the client device 110. The circumstance engine 116 is seen to include a history buffer 302 and a capture flow 304. The circumstance engine 116 of the client device 110 uses a client device processor/CPU (FIG. 8) executing code configured to capture performance of several APIs in association with parameters each time an API is called by the application 114. An example of the called APIs in association with API performance data, such as latency, and other parameters is shown in FIG. 6. The history buffer 302 stores the history of data, such as the latency for performing a task, such as image capture, when using different APIs.

Figure 4:
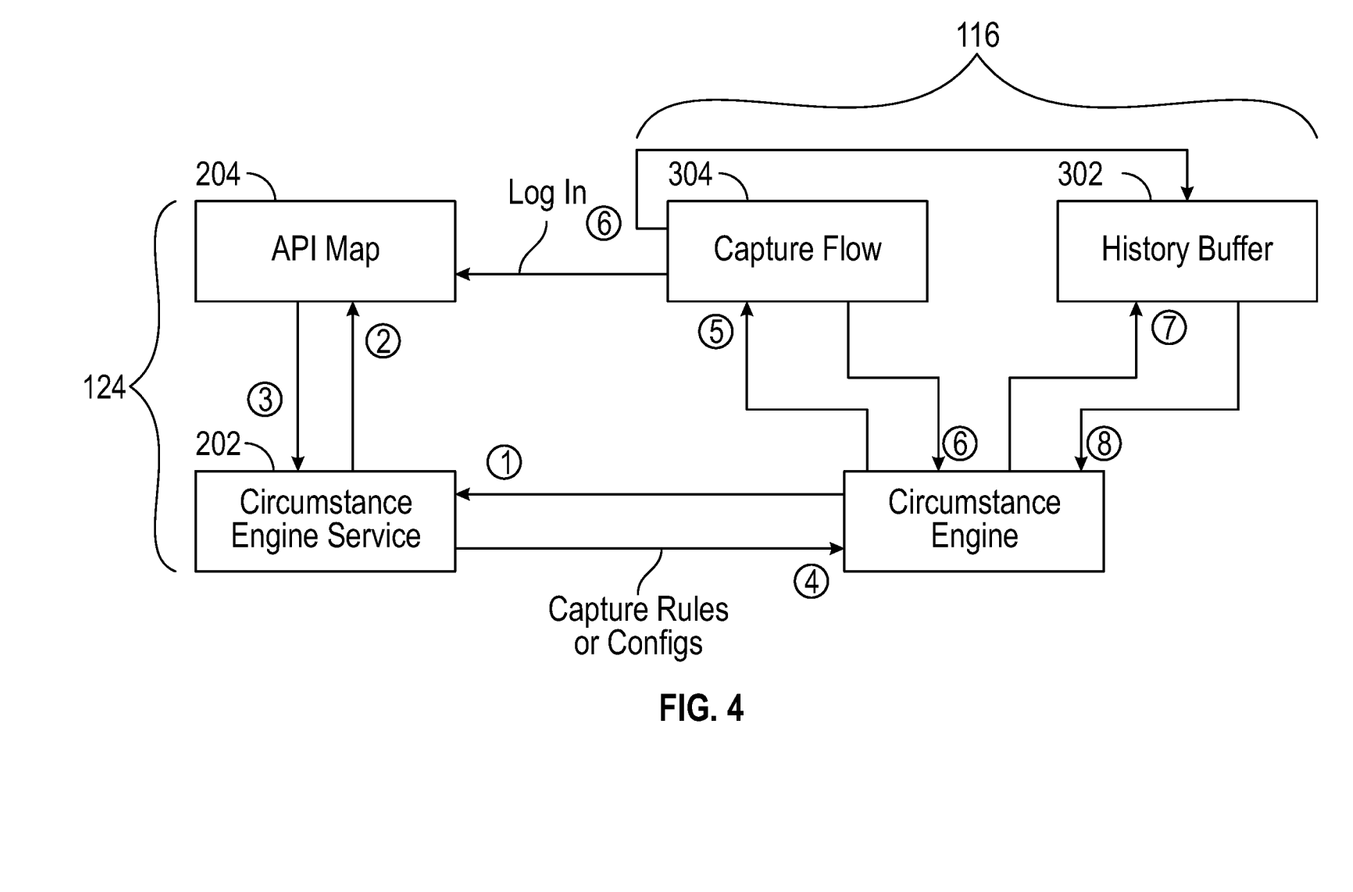
FIG. 4 illustrates a functional block diagram of the circumstance system and the circumstance engine being operable to determine the best API for a plurality of client devices when performing an application function.

Upon login (logIn) of client device 110 with server system 108, the API performance data in the history buffer 302 is provided via the capture flow 304 to the API map 204. This API performance history is dynamically provided to and updated in the API map 204. This stored performance history is used to perform branch API prediction is shown in FIG. 4. The history buffer 302 is stored in memory 904 (FIG. 9).

When a user initially interacts with a portion of the application 114 that requires choosing between two APIs, the application 114 calls the configuration network in circumstance engine service 202 to determine which API to call. The configuration network contains a set of rules that are ordered from the most ideal to least ideal. When a rule is evaluated as true, it specifies with API to use. In the branch prediction of APIs, the rules contain predicates to look up the prior executions for this context to see if the ideal request, such as an image capture request, is typically under the service level agreement (SLA) for the given use case. This historical data allows the circumstance engine 116 to quickly stop using APIs that are too intensive for some devices or users.

FIG. 4 illustrates a functional block diagram of the circumstance engine 116 operable to ascertain and store API performance data in the history buffer 302 in client device 110, and also to share the API performance data with the circumstance engine service 202 and API map 204 in circumstance system 124.

Figure 5:
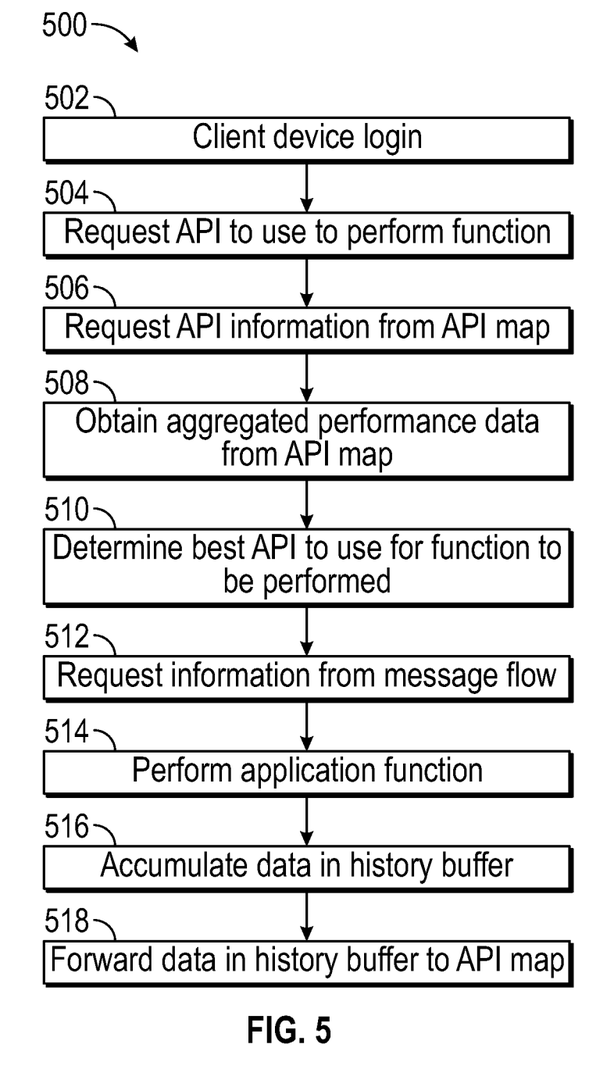
FIG. 5 illustrates an example algorithm of the circumstance system and the circumstance engine.
Figure 8:
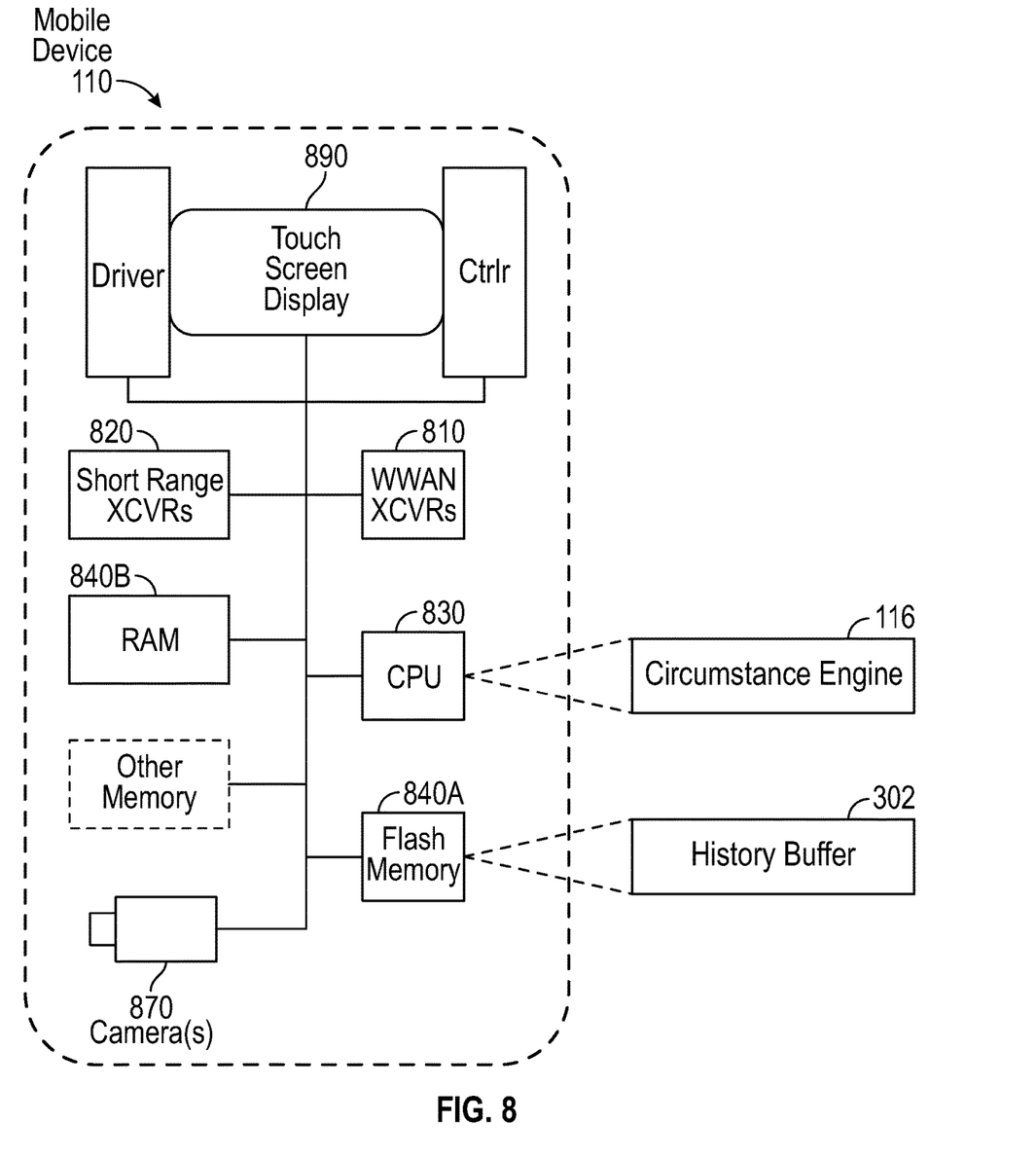
FIG. 8 is a high-level functional block diagram of an example client device comprising a mobile device that communicates via network with server system.
Figure 9:
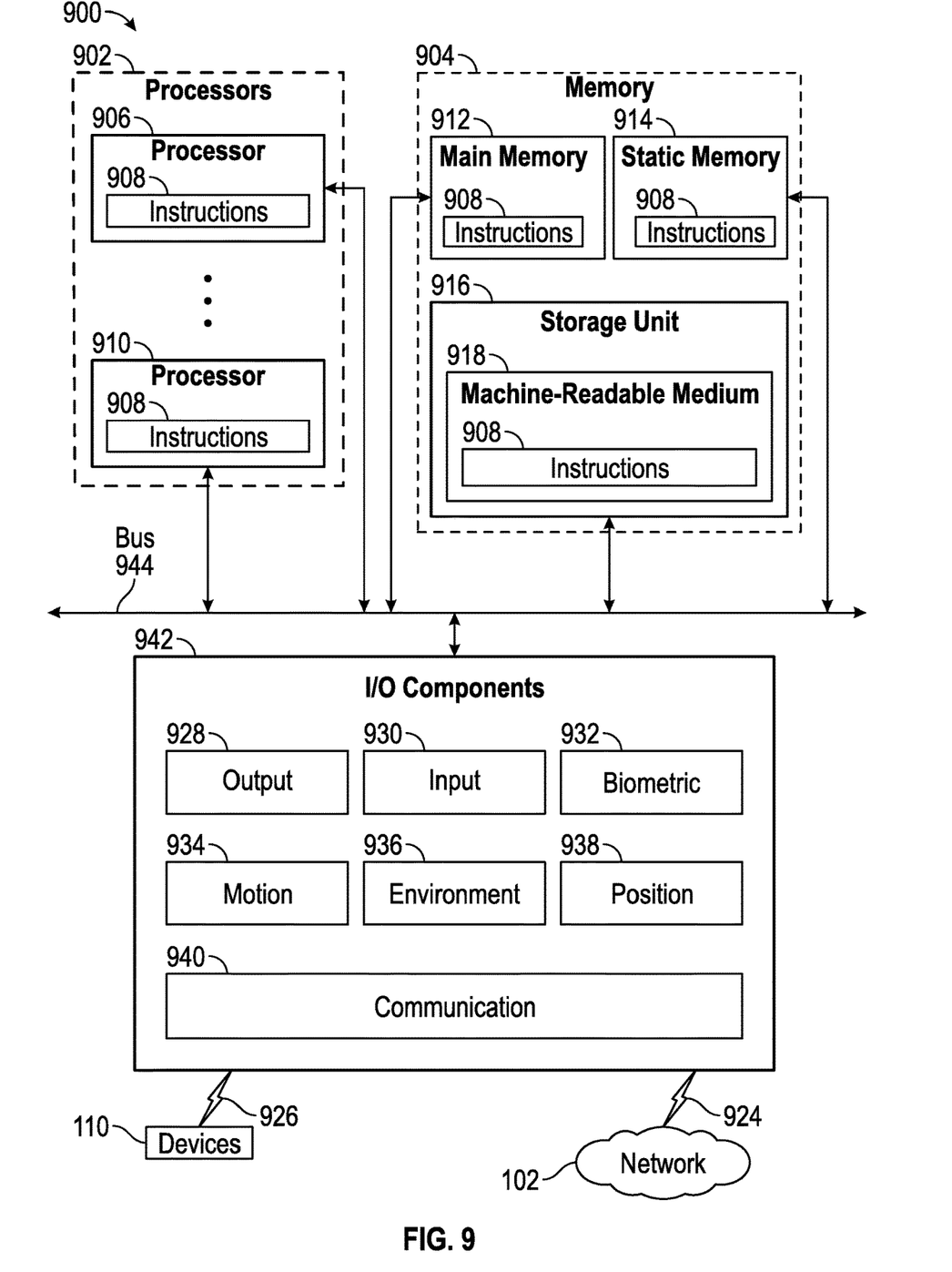
FIG. 9 is a diagrammatic representation of a machine in the form of a computer system within which a set of instructions may be executed for causing the machine to perform any one or more of the methodologies discussed herein, in accordance with some examples.

FIG. 5 illustrates an example algorithm 500 of the circumstance engine 116 executed by instructions running in the CPU 830 of client device 110 (FIG. 8), as well as the circumstance system 124 executed by instructions 908 running in the processor 902 of server system 108 (FIG. 9).

Referring to FIG. 4 and FIG. 5, at block 502 the client device 110 logs in with server system 108, shown as LogIn, and the configuration rules will be synced from the server system 108 to the client device 110.

At block 504, when the application 114 is ready to perform a function, such as capturing an image using a camera, the circumstance engine 116 communicates (numeral "1" in FIG. 4) with circumstance engine service 202 based on rules executed by both the circumstance engine 116 and the circumstance engine service 202. The circumstance engine service 202 and the circumstance engine 116 operate in tandem to make an API selection decision.

At block 506, the circumstance engine service 202 requests (numeral "2" in FIG. 4) API information from API map 204 (FIG. 7) to obtain the performance data of several APIs, such as the latency for each API. For example, API map 204 stores the latency for executing a plurality of functions per API, such as the time to capture an image after initiating a capture using a camera, and the time for a camera to become ready to capture an image after the feature is enabled in application 114. The performance data in the API map 204 is dynamically updated using data in the history buffer 302 as will be discussed shortly.

Figure 7:
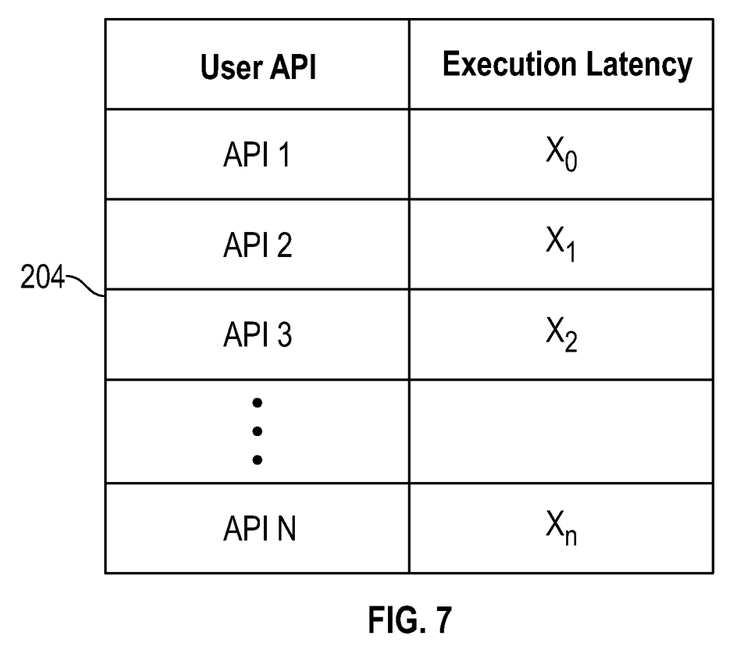
FIG. 7 illustrates an example chart of an API map.

At block 508, the circumstance engine service 202 obtains (numeral "3" in FIG. 4) the aggregated performance data of several APIs from API map 204, such as the latency for each of several APIs (FIG. 7). This enables the circumstance engine service 202 to consider the performance of a function based on an API, such as the latency for several different APIs, and communicate this performance data with circumstance engine 116.

At block 510, the circumstance engine service 202 and circumstance engine 116 together use rules to suggest (numeral "4" in FIG. 4) the API for the circumstance engine service 116 to use when the application 114 performs the function, such capturing an image. Since the information in API map 204 is dynamically updated based on data from history buffer 302, the aggregated data from the server system 108 and the history buffer 302 is used by the circumstance engine service 202 and circumstance engine 116 to dynamically suggest the best API for a performing given function on a per user per device basis.

At block 512, the circumstance engine 116 uses (numeral "5" in FIG. 4) the capture flow 304 in ultimately determining the best API for performing a given function on a per user per device basis. Thus, the determined API may or may not be the suggested API. As an example, the circumstance engine 116 may determine that API "A" is the best API for the application 114 to use to perform a function, such as capturing an image using a camera. In another example, the circumstance engine 116 may determine that the latency for capturing an image is too long, such that the latency, such as latency $x_0$, is greater than an acceptable latency limit L, and in such case determines that using API "B" having a latency $x_1$ is acceptable and thus API "B" is to be used.

At block 514, the circumstance engine 116 performs the function, such as image capture, and also stores (numeral "6" in FIG. 4) the API performance data, such as the latency during image capture, along with other parameters as a function of the API in history buffer 302, such as shown in FIG. 6.

At block 516, the history buffer 302 accumulates and stores (numeral "7" in FIG. 4) this API performance data along with other API performance data of previously called APIs. This accumulated API performances is dynamically updated to provide numerous data points for assessing an API performance.

At block 518, the history buffer continuously returns (numeral "8" in FIG. 4) the dynamically updated API performance data, such as the latencies associated with the APIs for numerous performed functions, to circumstance engine 116. The circumstance engine 116 also shares this updated API performance to circumstance engine service 202 for sharing with API map 204 in a closed loop. This closed loop algorithm helps the circumstance engine 116, in tandem with circumstance engine service 202 and using the API map 204, to suggest the best API for a given function, such as image capture.

FIG. 8 is a high-level functional block diagram of an example client device 110 comprising a mobile device that communicates via network 102 with server system 108 of FIG. 9. Shown are elements of a touch screen type mobile device 890 having the circumstance engine 116, although other non-touch type mobile devices can be used under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of the example mobile device 110 having a touch screen display for displaying content and receiving user input as (or as part of) the user interface. Mobile device 890 also includes a camera(s) 870, such as visible light camera(s).

The activities that are the focus of discussions here involve dynamically providing a selected API to the mobile device 110 for use in performing an application function. As shown in FIG. 8, the mobile device 110 includes at least one digital transceiver (XCVR) 810, shown as WWAN XCVRs, for digital wireless communications via a wide area wireless mobile communication network 102. The mobile device 110 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 890, the mobile device 890 can include a global positioning system (GPS) receiver. Alternatively, or additionally the mobile device 110 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 110 for user identification strategies.

Several of these types of communications through the transceivers 810, 820 and a network, as discussed previously, relate to protocols and procedures in support of communications with the server system 108 for selecting an API for use in performing an application function. Such communications, for example, may transport packet data via the short range XCVRs 820 over the wireless connections of network 102 to and from the server system 108 as shown in FIG. 1. Such communications, for example, may also transport data utilizing IP packet data transport via the WWAN XCVRs 810 over the network (e.g., Internet) 102 shown in FIG. 1. Both WWAN XCVRs 810 and short range XCVRs 820 connect through radio frequency (RF) send-and-receive amplifiers (not shown) to an associated antenna (not shown).

The mobile device 110 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 110 by configuring the mobile device to perform various operations, for example, in accordance with instructions or programming executable by processor 830. For example, such operations may include various general operations of the mobile device, as well as operations related to selecting an API for performing an application function, and reporting to server system 108. Although a processor may be configured by use of hardwired logic, typical processors in mobile devices are general processing circuits configured by execution of programming.

The mobile device 110 includes a memory or storage device system, for storing data and programming. In the example, the memory system may include a flash memory 840A and a random access memory (RAM) 840B. The RAM 840B serves as short term storage for instructions and data being handled by the processor 830, e.g. as a working data processing memory. The flash memory 840A typically provides longer term storage.

Hence, in the example of mobile device 110, the flash memory 840A is used to store programming or instructions for execution by the processor 830. Depending on the type of device, the mobile device 110 stores and runs a mobile operating system through which specific applications, including application 114. Applications, such image capturing, may be a native application, a hybrid application, or a web application (e.g., a dynamic web page executed by a web browser) that runs on mobile device 890 to uniquely identify the user. Examples of mobile operating systems include Google Android®, Apple IOS® (I-Phone or iPad devices), Windows Mobile®, Amazon Fire OS®, RIM Blackberry® operating system, or the like.

As shown, flash memory 840A storage device stores the history buffer 302 as shown in FIG. 6.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
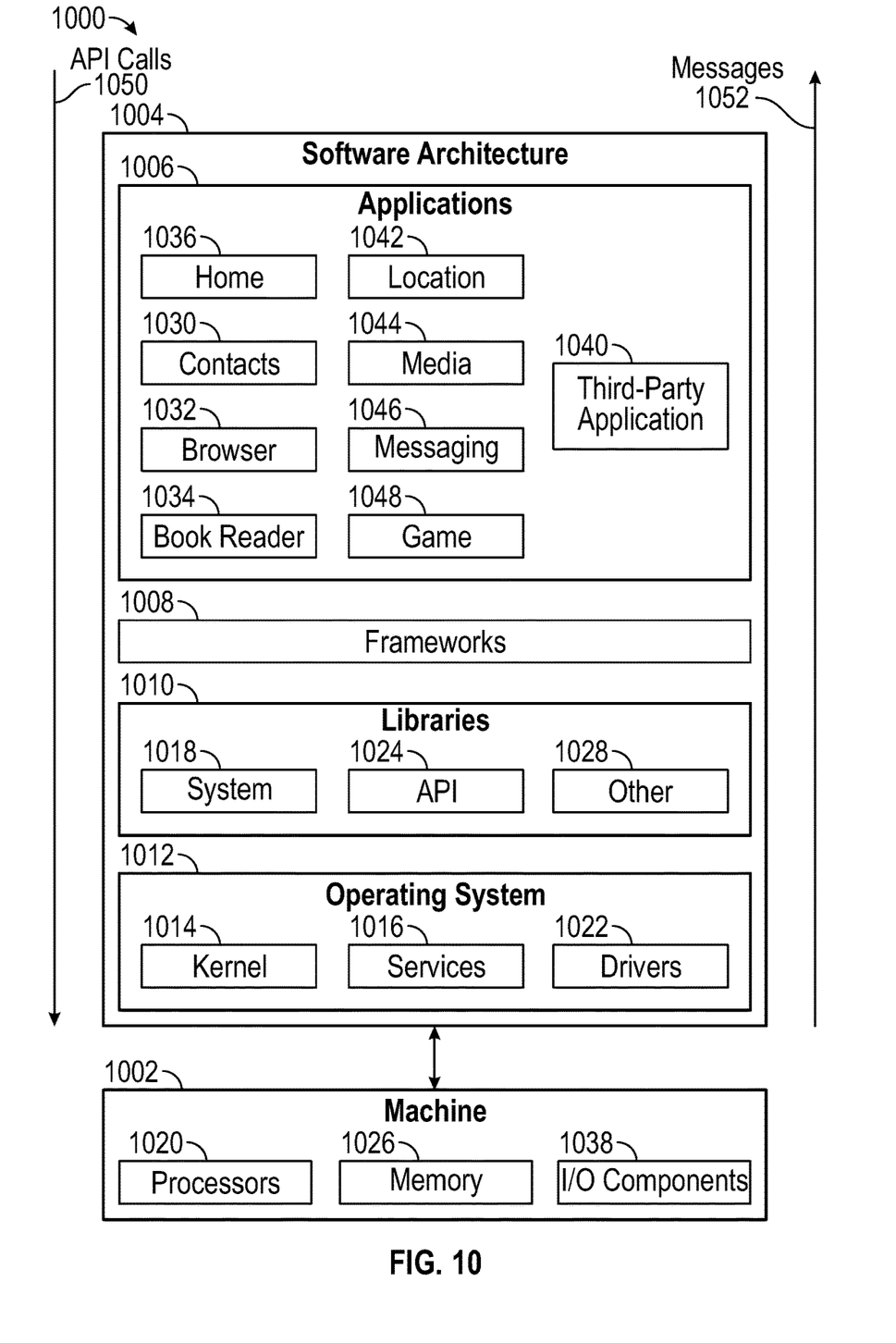
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method of operating a mobile device, comprising:
performing, by a device processor of the mobile device, an electronic application function of an electronic application using an application programming interface (API) to create actual electronic performance data of the electronic application on the mobile device, wherein the mobile device has a circumstance engine operable by the device processor and configured to capture performance of several APIs in association with parameters each time an API is called by the electronic application;
storing, in a memory of the mobile device, a history of the actual electronic performance data of the API associated with performing the electronic application function, wherein the history of the actual electronic performance data is latency of a camera of the mobile device in capturing an image;
sending, by the device processor, the history of the actual electronic performance data to a server having a server processor, wherein the server has a circumstance engine service operable by the server processor, wherein the circumstance engine service has rules configured to provide the electronic application running on the mobile device with configuration settings based on the mobile device and current circumstances for the electronic application running on the mobile device;
storing in the server the history of the actual electronic performance data including the latency of the camera in capturing an image; and
operating the circumstance engine by executing instructions in tandem with the circumstance engine service executing instructions, wherein the device processor and the server processor together use a message flow between them in real-time, such that the device processor and the server processor together determine a suggested API for use by the electronic application running on the mobile device based on an API map with the latency performance of the camera, wherein the API map is updated continuously with the camera's latency performance to dynamically support making the determination and updating the rules, wherein the API map is stored in the server.

2. A mobile device, comprising:
a memory that stores instructions; and
a device processor configured by the instructions to perform operations to:
perform an electronic application function of an electronic application using an application programming interface (API) to create actual electronic performance data of the electronic application on the mobile device, wherein the mobile device has a circumstance engine operable by the device processor and configured to capture performance of several APIs in association with parameters each time an API is called by the electronic application;
store a history of the actual electronic performance data of the API associated with performing the electronic application function in a memory of the mobile device, wherein the history of the actual electronic performance data is latency of a camera of the mobile device in capturing an image;
send the history of the actual electronic performance data to a server having a server processor, wherein the server has a circumstance engine service operable by the server processor, wherein the circumstance engine service has rules configured to provide the electronic application running on the mobile device with configuration settings based on the mobile device and current circumstances for the electronic application running on the mobile device;
store in the server the history of the history of the actual electronic performance data including the latency of the camera in capturing an image;
operate the circumstance engine by executing instructions in tandem with the circumstance engine service executing instructions, wherein the device processor and the server processor together use a message flow between them in real-time, such that the device processor and the server processor together determine a suggested API for use by the electronic application running on the mobile device based on an API map associated with the latency performance of the camera, wherein the API map is updated continuously with the camera's latency performance to dynamically support making the determination and updating the rules, wherein the API map is stored in the server.

3. A non-transitory processor-readable storage medium storing processor-executable instructions that, when executed by a device processor of a mobile device, cause the device processor to perform operations comprising:
performing an electronic application function of an electronic application using an application programming interface (API) to create actual electronic performance data of the electronic application on the mobile device, wherein the mobile device has a circumstance engine operable by the device processor and configured to capture performance of several APIs in association with parameters each time an API is called by the electronic application;
storing in a memory of the mobile device a history of the actual electronic performance data of the API associated with performing the electronic application function, wherein the history of the actual electronic performance data is latency of a camera of the mobile device in capturing an image;
sending the history of the actual electronic performance data to a server having a server processor, wherein the server has a circumstance engine service operable by the server processor, wherein the circumstance engine service has rules configured to provide the electronic application running on the mobile device with configuration settings based on the mobile device and current circumstances for the electronic application running on the mobile device;
storing in the server the history of the history of the actual electronic performance data including the latency of the camera in capturing an image;
operating the circumstance engine by executing instructions in tandem with the circumstance engine service executing instructions, wherein the device processor and the server processor together use a message flow between them in real-time, such that the device processor and the server processor together determining a suggested API for use by the electronic application running on the mobile device based on an API map associated with the latency performance of the camera, wherein the API map is updated continuously with the camera's latency performance to dynamically support making the determination and updating the rules, wherein th nap, wherein the API map is stored in the server.

* * * * *